(12) United States Patent
Sanjurjo et al.

(10) Patent No.: US 8,709,370 B2
(45) Date of Patent: Apr. 29, 2014

(54) METHOD AND SYSTEM FOR PRODUCING FLUORIDE GAS AND FLUORINE-DOPED GLASS OR CERAMICS

(75) Inventors: Angel Sanjurjo, San Jose, CA (US);
Kai-Hung Lau, Cupertino, CA (US);
Xiaobing Xie, Foster City, CA (US);
Gopala Krishnan, Sunnyvale, CA (US)

(73) Assignee: SRI International, Menlo Park, CA (US)

( * ) Notice: Subject to any disclaimer, the term of this patent is extended or adjusted under 35 U.S.C. 154(b) by 756 days.

(21) Appl. No.: 12/549,206

(22) Filed: Aug. 27, 2009

(65) Prior Publication Data

US 2010/0056353 A1  Mar. 4, 2010

Related U.S. Application Data

(60) Provisional application No. 61/092,618, filed on Aug. 28, 2008.

(51) Int. Cl.
*C01B 33/02* (2006.01)
*C01B 33/107* (2006.01)
*C01B 33/32* (2006.01)
*C01B 3/02* (2006.01)

(52) U.S. Cl.
USPC ............ 423/350; 423/342; 423/490; 423/332

(58) Field of Classification Search
USPC ...................... 423/342, 332–334, 350, 490
See application file for complete search history.

(56) References Cited

U.S. PATENT DOCUMENTS

| | | | | |
|---|---|---|---|---|
| 1,869,019 A | * | 7/1932 | McIntyre | 423/490 |
| 2,526,776 A | * | 10/1950 | Calfee et al. | 423/483 |
| 2,559,683 A | * | 7/1951 | Skinner | 373/31 |
| 2,981,601 A | * | 4/1961 | Kidde | 423/483 |
| 2,999,736 A | * | 9/1961 | Shalit | 423/341 |
| 3,222,775 A | * | 12/1965 | Whitney | 228/175 |
| 3,870,532 A | * | 3/1975 | Biegler et al. | 106/636 |
| 4,160,012 A | * | 7/1979 | Ono et al. | 423/341 |
| 4,442,082 A | * | 4/1984 | Sanjurjo | 423/350 |
| 4,446,120 A | * | 5/1984 | Schmidt et al. | 423/350 |
| 4,521,523 A | * | 6/1985 | Aubourg et al. | 501/30 |
| 4,529,576 A | * | 7/1985 | Sancier | 423/350 |
| 4,584,181 A | * | 4/1986 | Nanis et al. | 422/241 |
| 4,590,043 A | * | 5/1986 | Sanjurjo | 117/223 |
| 4,615,872 A | * | 10/1986 | Porcham | 423/341 |
| 4,655,827 A | * | 4/1987 | Sanjurjo et al. | 75/399 |
| 4,748,014 A | * | 5/1988 | Nanis et al. | 423/350 |
| 4,751,203 A | | 6/1988 | Toussaint et al. | |
| 4,753,783 A | * | 6/1988 | Sanjurjo | 423/350 |
| 4,777,030 A | * | 10/1988 | Sancier | 423/348 |
| 4,871,694 A | | 10/1989 | Legare | |
| 5,340,516 A | | 8/1994 | Yavuz et al. | |

(Continued)

OTHER PUBLICATIONS

Blau et. al., Industrial and Engineering chemistry vol. 26, No. 10, (1934), pp. 1060-1062.*
Nanis et. al. "Novel Duplex vapor-Electrochemical Method for Silicon Solar Cells", Mar. 31, 1980.*

(Continued)

*Primary Examiner* — Jason L Lazorcik

(57) ABSTRACT

The present invention relates generally to production of a fluoride gas and equivalents thereof, and fluorine-doped sodium silicate glass, glass ceramics, vitro ceramics and equivalents thereof. In one embodiment, the method includes providing a salt and an oxide in a reactor, heating the reactor to produce a vapor and the vitro ceramic and removing the vapor.

3 Claims, 7 Drawing Sheets

(56) References Cited

U.S. PATENT DOCUMENTS 5,955,388 A     9/1999   Dejneka
5,981,413 A * 11/1999   Hale ............................. 501/32
7,455,822 B2 * 11/2008   Kondo et al. ................ 423/350

OTHER PUBLICATIONS

International Search Report and Written Opinion for PCT/US09/55226; Mar. 3, 2010, consists of 12 pages.

The First Office Action for Japanese Patent Application No. 200980137673.9, Dec. 13, 2012, consists of 9 pages.

* cited by examiner

METHOD AND SYSTEM FOR PRODUCING FLUORIDE GAS AND FLUORINE-DOPED GLASS OR CERAMICS

CROSS REFERENCE TO RELATED APPLICATIONS

This application claims the benefit of U.S. Provisional Application No. 61/092,618, filed on Aug. 28, 2008, which is herein incorporated by reference in its entirety.

FIELD OF THE INVENTION

The present invention relates generally to a method and system for producing fluoride gas and equivalents thereof, and fluorine-doped glass, ceramics, vitro ceramic and equivalents thereof.

BACKGROUND OF THE INVENTION

During the production of high purity metals, for example silicon (Si) or titanium (Ti), many by-products may be produced. One by-product in particular is sodium fluoride (NaF). In current production of high purity Si, NaF is typically packaged and sold. It is used for hydrofluoric acid (HF) production, water fluoridation, as an additive in tooth paste, and the largest volume is for metallurgical fluxes or electrolytes such as those used to produce aluminum metal. If the NaF produced in very large quantities can be sold only for the lowest cost application, then this results in lower credits and, thus, lower revenue for the whole process.

Further adding to the raw material cost during the production of high purity metals, for example Si or Ti, is the need of a large continuous stream of a source of the metal. For example, to produce high purity Si a large continuous source of fluorosilicic acid ($H_2SiF_6$) is needed. Typically, the $H_2SiF_6$ is purchased as a by-product from the fertilizer industry. The present disclosure provides solutions to the issues described above.

SUMMARY OF THE INVENTION

In one embodiment, the present invention is directed towards producing a vitro ceramic. In one embodiment, the method comprises providing a salt and an oxide in a reactor, heating said reactor to produce a vapor and said vitro ceramic and removing said vapor.

In one embodiment, the present invention is directed towards a method for recycling a salt during a production of a high purity metal to produce a ceramic. The method comprises providing said salt produced as a by-product from said production of the high purity metal, providing an oxide, heating a mixture of said salt and said oxide in a reactor to produce a gas and said ceramic and recycling said gas in said production of said high purity metal.

In one embodiment, the present invention is directed towards a method for producing sodium silicate glass. The method comprises providing sodium fluoride (NaF) and silica sand ($SiO_2$) in a reactor, wherein said NaF is provided as a by-product of a process to produce a high purity metal, heating said reactor to produce a silicon tetrafluoride gas ($SiF_4$) and said sodium silicate glass doped with fluorine ions ($Na_2SiO_3(F)$) and recycling said $SiF_4$ back into said process to produce said high purity metal.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
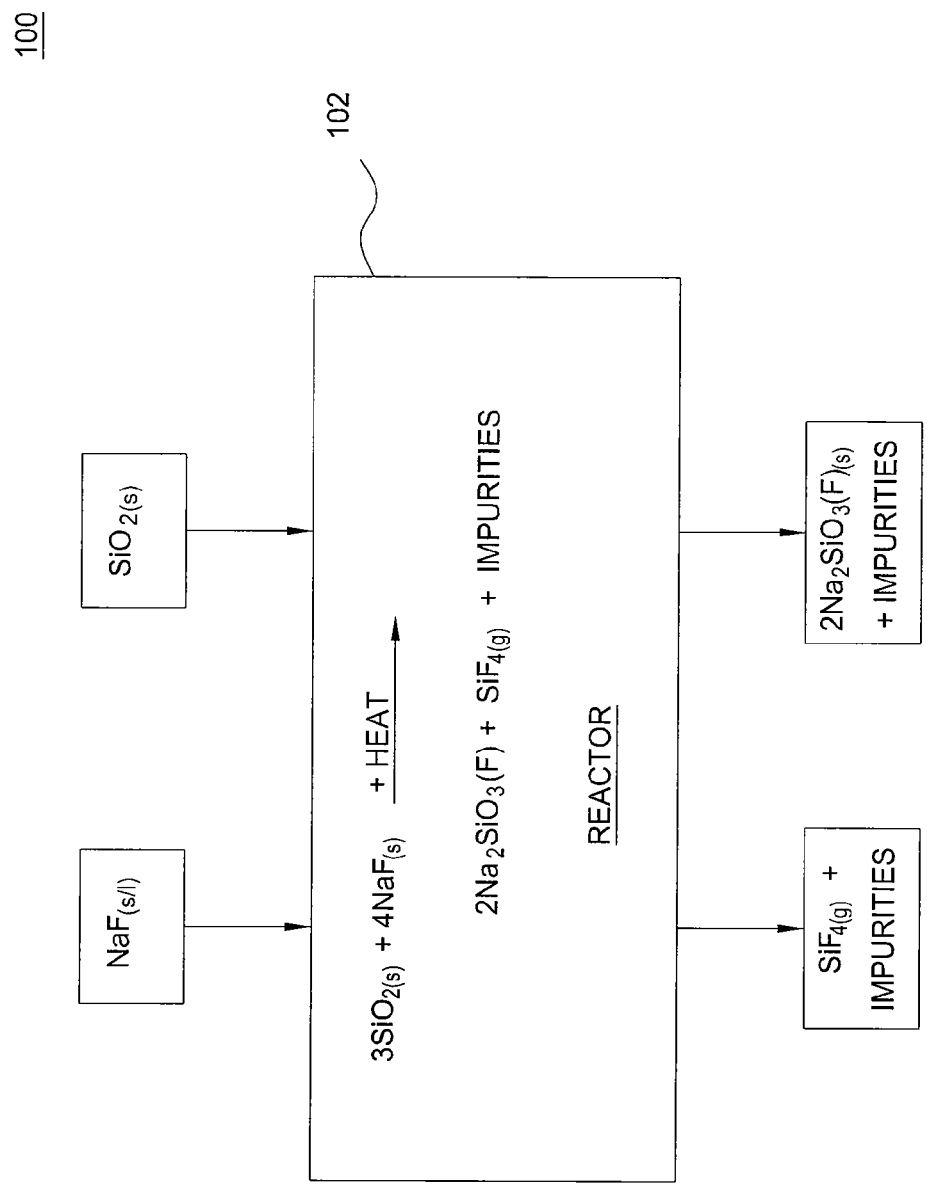
FIG. 1 illustrates one embodiment of a process flow diagram for producing silicon tetrafluoride gas and fluorine-doped sodium silicate glass.

The present invention provides a process for producing a vapor/gas and glass and/or ceramics. Hereinafter, the glass and/or ceramics may be collectively referred to as a ceramic. In one embodiment, the process begins with an oxide and a salt. In one embodiment, the oxide may be a metallic oxide or a non-metallic oxide. In one embodiment, the salt may be a fluoride salt. The fluoride salt, in a solid or molten form, and a solid metal oxide are heated in a reaction chamber to yield a first product of fluoride gas and a second product of a solid fluorine doped glass or ceramic with some impurities. A general equation of the reaction is shown below as Equation (1):

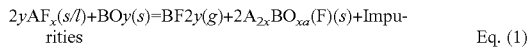

$$2yAF_x(s/l)+BOy(s)=BF2y(g)+2A_{2x}BO_{xa}(F)(s)+\text{Impurities} \qquad \text{Eq. (1)}$$

In the above equation, A may be any Group I or II element or lanthanide element, including lithium (Li), sodium (Na), potassium (K), magnesium (Mg), calcium (Ca), barium (Ba), strontium (Sr), lanthanum (La) or cerium (Ce). Thus, the salt may be lithium fluoride (LiF), sodium fluoride (NaF), potassium fluoride (KF), magnesium fluoride ($MgF_2$), calcium fluoride ($CaF_2$), strontium fluoride ($SrF_2$), or barium fluoride ($BaF_2$) or fluorides of the lanthanides, such as for example, $LaF_3$ or $CeF_3$. In one embodiment, A is sodium and the salt is sodium fluoride. In addition, molten chlorides (not shown) may be mixed with the salt to help lower a melting point of the salt.

B in Equation (1) may be an element such as boron (B), aluminum (Al), gallium (Ga), indium (In), silicon (Si), germanium (Ge), titanium (Ti), zirconium (zr) or any transition metal. In one embodiment, B in Equation (1) is either Si or titanium Ti. It should be noted that the subscripts or variables x, y and xa are a function of the elements used in Equation (1). That is, x may be an integer that represents the number of F atoms; y may be an integer that represents a number of O atoms and the like. The additional acceptable impurities may be determined by a thermochemical model based on Gibbs energy minimization and predicted composition versus temperature.

In one embodiment, the above equation may be applied to a process for producing a high purity semiconductor, such as for example, Si or Ge, or a metal, such as for example, Ti or Zr. For example, in the process for producing high purity Si, a by-product of NaF is produced. In this particular example, a specific equation of the reaction when molten NaF is reacted with silicon dioxide ($SiO_2$) is shown below as Equation (2):

$$4+x\text{NaF}(s/l)+3SiO_2(s)+\text{Impurities}=SiF_4(g)+2Na_2SiO_3 \\ (Fx)(s)+\text{Impurities} \quad \text{Eq. (2)}$$

It should be noted that the "x" may vary depending on the number of fluorine ions contained in the sodium silicate glass or ceramic. In one embodiment, the silicon dioxide may be silica sand, or an equivalent silica source. Notably, the sand may be unpurified sand that is readily available. In the above exemplary reaction equation having the above species and components, the impurities predicted by a thermochemical model based upon Gibbs energy minimization and predicted composition versus temperature may include, for example, NaF, $SiOF_2$ and $Si_2OF_6$ as well as fluorides and oxyfluorides of impurity elements.

FIG. 1 illustrates one embodiment of a reaction 100 as described above. To drive the reaction 100 of the molten NaF with the $SiO_2$, the two reactants may be heated in a reactor 102. In other words, the reaction equation shown in Eq. (2) may be considered endothermic up to some temperature. At some point the entropy of the gas phase helps to drive the reaction to generate silicon tetrafluoride ($SiF_4$) gas. The molten NaF and $SiO_2$ may be heated to an approximate range of about 1000 degrees Celsius (° C.) to about 1500° C.

As more heat is applied to the reaction at higher temperatures, the more $SiF_4$ vapor or gas is evolved. Hereinafter, $SiF_4$ vapor or gas may be referred to collectively as $SiF_4$ gas. As the reaction temperature approaches approximately 1300° C., a vapor pressure of the $SiF_4$ gas product reaches over 200 Torrs. Consequently, the $SiF_4$ gas may be extracted out of the reactor at industrially reasonable rates using liquid nitrogen condensation or a compressor.

The removed $SiF_4$ gas may contain impurities, although most of the impurities remain in the liquid phase. As a result, in one embodiment, the $SiF_4$ gas may be purified. Any known purification process may be used to remove the impurities from the $SiF_4$ gas such as distillation, condensation, adsorption, absorption, filtering, membranes, hybrid technologies and the like. In one embodiment, a partial cooling of the $SiF_4$ stream to condense less volatile species and/or a condenser absorber train may be used to purify the $SiF_4$ gas.

The purified $SiF_4$ gas may have many uses. In one embodiment, the purified $SiF_4$ gas may be reacted with molten Na to produce Si, as will be discussed in further detail below. In another embodiment, the purified $SiF_4$ gas may be used to produce $SiH_4$ by reaction with a hydride species.

After the $SiF_4$ gas is removed, the remaining product may be a molten mass that upon cooling becomes an amorphous silica based glass, ceramic or vitro ceramic. In one embodiment, the remaining product is a sodium silicate ($Na_2SiO_3$) glass or ceramic with embedded fluorine atoms ($Na_2SiO_3(F)$) and in some cases nano or microprecipitates of crystalline NaF. As the temperature of the reaction 100 goes higher to an approximate range of 1200° C. to 1350° C., the $SiF_4$ gas evolution increases (as noted above) and a transparent glass is obtained having residual fluorine.

The fluorine doped sodium silicate glass or ceramic produced from the reaction of NaF and $SiO_2$ in Eq. (2) above is unexpectedly found to have advantageous properties that may have many industrial applications. For example, experiments on the sodium silicate glass with embedded fluorine atoms or ions and sodium ions have revealed that the conductivity of the fluorine ions within the sodium silicate vitro ceramic or glass is very high at room temperature. The sodium ions are found to have similarly high conductivity at room temperature. Thus, the fluorine doped sodium silicate glass with embedded fluorine atoms or ions and sodium ions may be used as a fluoride ion conductive material or a sodium ion conductive material.

In addition, the fluorine doped sodium silicate glass or ceramic is observed to be resistant to etching in hydrofluoric acid (HF) solutions. As a result, the fluorine doped sodium silicate glass or ceramic may be used to design new membranes, barriers, coatings, optical applications or new electrolytes for fuel cells or sensors. It should be noted that the new fluorine doped sodium silicate glass or ceramic produced by the novel process disclosed herein may have additional applications that are within the scope of the present invention.

It should be noted that the above process is not limited to only silicon minerals such as silicon oxides. The above process may be extrapolated to be used with other semiconductors such as Ge or metals such as aluminum (Al), gallium (Ga), indium (In) and transitional metals titanium (Ti), vanadium (V), zirconium (Zr), niobium (Nb), molybdenum (Mo), tungsten (W) and tantalum (Ta), and even non-metals such as B.

Figure 2:
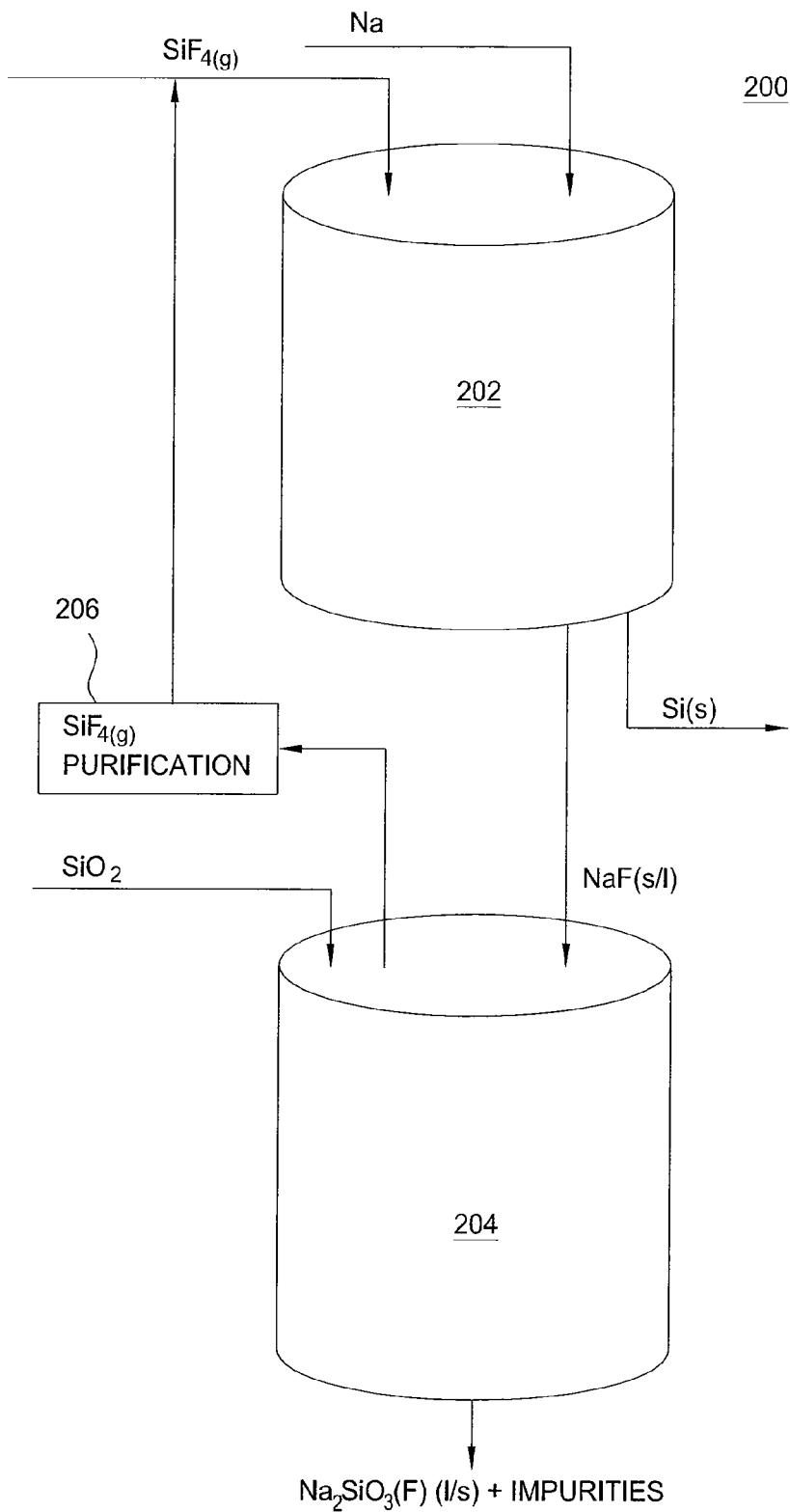
FIG. 2 illustrates one embodiment of the present invention as applied to a process for making silicon.

The novel process described above may be used in various industrial processes to recycle materials or prevent waste. For example, FIG. 2 illustrates a high level process flow diagram of the present invention as applied within a process 200 for producing high purity Si. It should be noted that the process 200 may be equally applied to a process for producing Ti metal. One exemplary process for producing high purity silicon is by using fluorosilicic acid ($H_2SiF_6$) as described in U.S. Pat. No. 4,442,082 issued to Angel Sanjurjo, U.S. Pat. No. 4,584,181, issued to Nanis, et al. and U.S. Pat. No. 4,590,043, issued to Angel Sanjurjo, which are all hereby incorporated by reference.

A brief discussion of a process of producing high purity Si from $H_2SiF_6$ will aid the reader on understanding a useful application of the present invention in one embodiment. An overall process 300 illustrated in FIG. 3 consists of three major operations which encompass a series of steps. The first major operation includes the step of precipitation of sodium fluorosilicate ($Na_2SiF_6$) from fluorosilicic acid ($H_2SiF_6$) followed by generation of silicon tetrafluoride gas ($SiF_4$) illustrated as a block of steps 310 in FIG. 3. Alternatively, the $H_2SiF_6$ may be obtained by treating silica or silicates with hydrogen fluoride (HF). The precipitation of $Na_2SiF_6$ from $H_2SiF_6$ comprises a reaction equation as shown below by Eq. (3) and in sub-step 312 of FIG. 3.

$$H_2SiF_6(aq)+2\text{NaF}(c)=Na_2SiF_6(c)+2HF(aq) \quad \text{Eq. (3)}$$

The $Na_2SiF_6$ is filter dried in sub-step 314. Subsequently, the $Na_2SiF_6$ is thermally decomposed in step 316 with heat. In one embodiment, the $Na_2SiF_6$ may be heated up to approximately 650° C. The reaction equation for the thermal decomposition of $Na_2SiF_6$ is shown below by Eq. (4) and in sub-step 316 of FIG. 3.

$$Na_2SiF_6(c)+\text{heat}=SiF_4(g)+2\text{NaF}(c) \quad \text{Eq. (4)}$$

Figure 3:
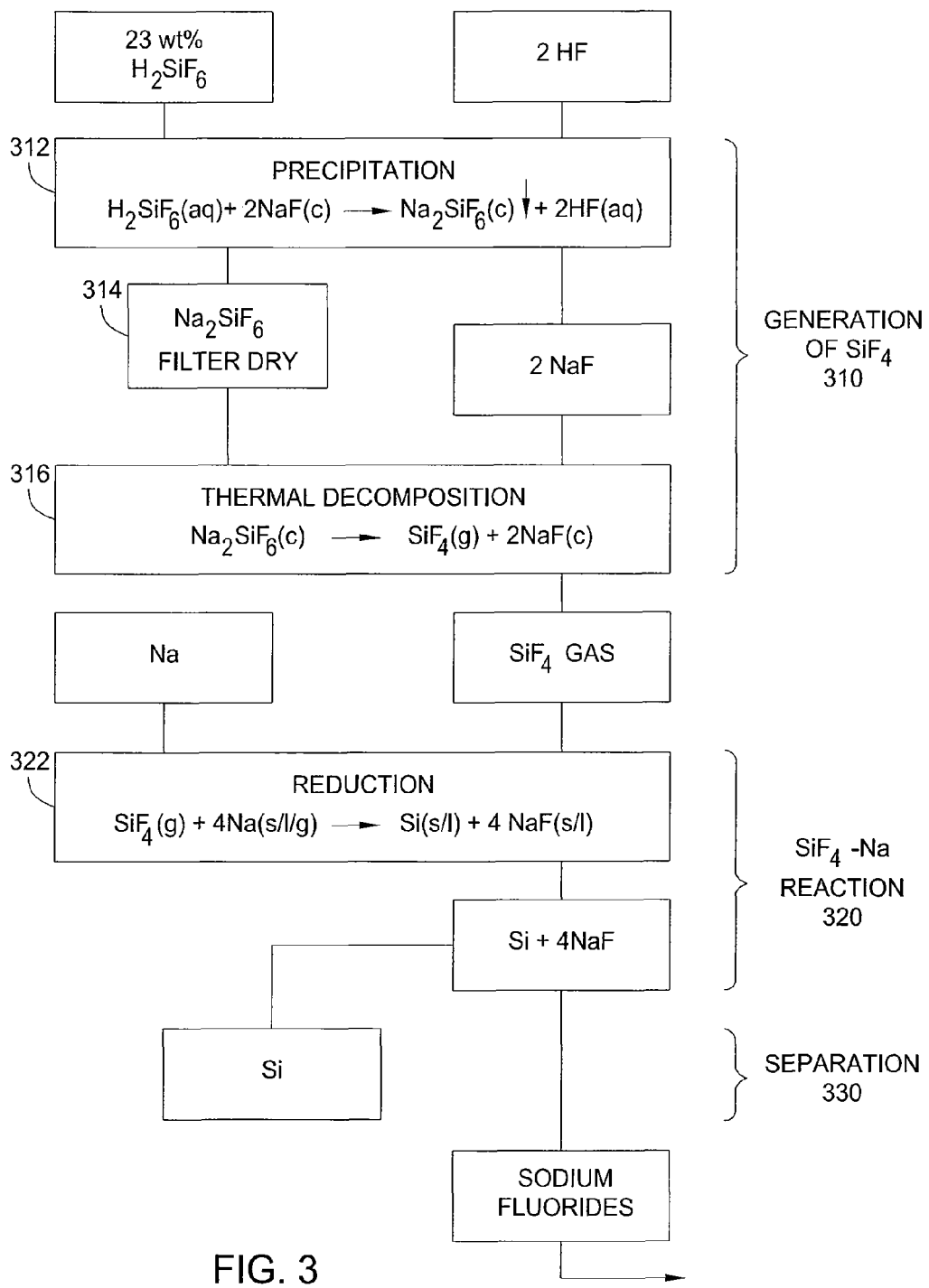
FIG. 3 illustrates a flow diagram of an exemplary process for producing high purity silicon by a melt process that may utilize the present invention.

The second major operation comprises the reduction of the $SiF_4$ gas to silicon (Si), preferably by sodium (Na) as illustrated by a block of steps 320 in FIG. 3. The reduction of the $SiF_4$ gas to silicon is shown below by Eq. (5) and in sub-step 322 of FIG. 3.

$$SiF_4(g)+4\text{Na}(s/l/g)=Si(s/l)+4\text{NaF}(s/l) \quad \text{Eq. (5)}$$

The third major operation involves the separation of Si from the mixture of Si and molten sodium fluoride (NaF) as shown in a block of steps 330 in FIG. 3. Further details of each of the above identified operations are disclosed in U.S. Pat. Nos. 4,442,082, 4,584,181 and 4,590,043, which are hereby incorporated by reference. Moreover, the above steps are merely provided as an example and are not to be considered limiting.

Previously, the NaF that was separated from the Si was packaged and sold. In some cases, the NaF could be transformed into HF, used for other metallurgical fluxing applications or for fluoridation in water or tooth paste. In some cases, it may be possible NaF can simply be transformed into calcium fluoride ($CaF_2$) and disposed of, but that results in higher raw material costs and lower revenue. Further adding to the raw material costs is a continuous large stream of $H_2SiF_6$ that was needed to produce $SiF_4$ gas, which continually fed the second major operation includes block of steps 320 of the above process 300 with the needed $SiF_4$ gas.

In one embodiment, the present invention may be applied to the above process 300 to "close" the NaF stream rather than attempting to package and sell the NaF, transform the NaF or dispose of the NaF. In doing so, the present invention also provides an unexpected result of producing a solid fluorine doped glass, ceramic or vitro ceramic with the advantageous characteristics and benefits associated with the solid fluorine doped glass or ceramic described above.

One embodiment of this implementation is illustrated in FIG. 2. For example, the block of steps 320 and 330 are illustrated in a flow diagram in FIG. 2. In one embodiment, molten Na is reacted with $SiF_4$ gas in a reactor 202. The Na is used to reduce the $SiF_4$ gas to silicon. The reactor 202 may be any reactor suitable for carrying out the above reaction. For example, the reactor may be any reactor vessel such as a batch reactor, a semicontinuous or continuous reactor or any reactor vessel as described in U.S. Pat. Nos. 4,442,082, 4,584,181 and 4,590,043, which are hereby incorporated by reference. Reaction parameters for the above process of reducing the $SiF_4$ gas to Si with Na are provided in U.S. Pat. Nos. 4,442,082, 4,584,181 and 4,590,043, which are hereby incorporated by reference.

The reaction of molten Na and $SiF_4$ gas produces molten NaF and Si. The molten NaF is separated from the Si and removed from the reactor 202 and then fed into a reactor 204. Silicon dioxide ($SiO_2$) (e.g. purified or unpurified silica sand) may be fed into the reactor 204 with the molten NaF. As noted above, the reactor 204 may be any type of reactor suitable for carrying out the reaction of molten NaF with $SiO_2$ within the temperature ranges described above. For example, the reactor may be a batch reactor, a semicontinuous or continuous reactor and the like.

Subsequently, the reactor 204 may be heated to drive the reaction of molten NaF and $SiO_2$. In one embodiment, the molten NaF and $SiO_2$ may be heated to an approximate range of about 1000° C. to about 1500° C. The reaction produces $SiF_4$ gas and sodium silicate glass or ceramic ($Na_2SiO_3$) with embedded fluorine ions and sodium ions, as discussed above.

Notably, energy produced by the reaction carried out in reactor 202 may have a synergistic relationship with respect to the energy consumed by the reaction carried out in reactor 204. For example, the reaction of Na and $SiF_4$ gas in reactor 202 is very exothermic. The reaction of NaF and $SiO_2$ in reactor 204 is endothermic. As a result, the energy and heat released by the reaction carried out in reactor 202 may be captured and used to heat the reaction carried out in reactor 204. As a result, no additional energy may need to be applied from an external source to heat the reaction of NaF and $SiO_2$. For example, although FIG. 2 illustrates the use of two separate reactors 202 and 204, one skilled in the art will recognize that in one embodiment a single reactor may be used. As a result, the energy released by the reaction of Na and $SiF_4$ gas may be used to heat the reaction of NaF and $SiO_2$.

The $SiF_4$ gas may be removed from the reactor 204 and purified at block 206 to remove any impurities, as described above. In one embodiment, a condenser absorber train may be used to purify the $SiF_4$ gas. The purified $SiF_4$ gas may then be fed back into the reactor 202 to react with Na to produce Si and NaF. Notably, the present invention may replace the need to perform the block of steps 310 in FIG. 3 by recycling materials already within the processes 200 and 300. Thus, the process 200 may continuously recycle the molten NaF produced by the reduction of $SiF_4$ gas to Si by Na to re-generate more $SiF_4$.

In addition, the cost of raw materials is greatly lowered within the above process for producing Si because the need for $H_2SiF_6$ and/or $NaSiF_6$ is reduced only to an amount necessary for makeup needs. For example, only a small amount of makeup fluorine is needed to replace the fluorine lost in the fluorine doped sodium silicate glass or ceramic produced by the reaction carried out in reactor 204. Moreover, due to the unexpected properties of the sodium silicate glass or ceramic with embedded fluorine ions and sodium ions discussed above, the demand may be greater than the demand for NaF that was previously packaged and sold. As a result, more revenue may also be recaptured with the above process due to the valuable properties of the sodium silicate glass or ceramic with embedded fluorine ions and sodium ions.

It should be noted that FIG. 2 is only one particular example of a process that may reap benefits from the present invention. That is, it should be recognized that the present invention may be usefully applied to any process that requires recycling a halide salt to produce a fluoride gas. For example, as noted above, the above process may be applied to a process for producing titanium metal.

Figure 4:
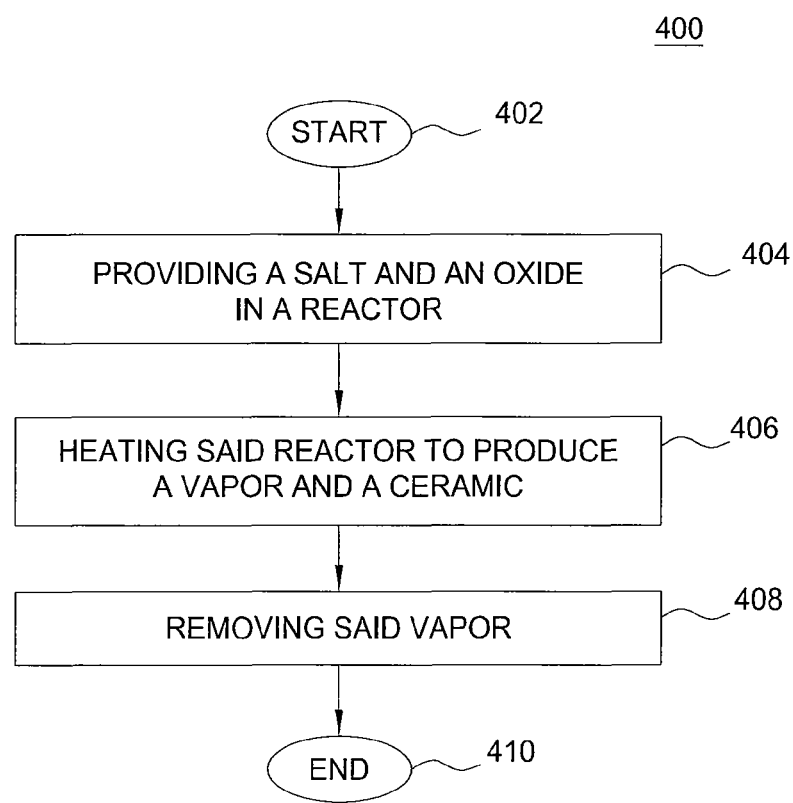
FIG. 4 illustrates a flow diagram of one embodiment of a method for producing a ceramic.

FIG. 4 illustrates a flow diagram of one embodiment of a method 400 for producing a ceramic. In one embodiment, the method 400 may be implemented as described above with reference to FIG. 1. The method 400 begins at step 402.

At step 404, the method 400 provides a salt and an oxide in a reactor. For example, the salt may be a salt produced as a by-product from a production of a high purity metal as described above and illustrated in FIG. 3. The oxide may be a metallic oxide or a non-metallic oxide.

At step 406, the method 400 heats the reactor to produce a vapor and a ceramic. For example, the vapor may be a $SiF_4$ gas and the ceramic may be a sodium silicate ceramic doped with fluorine ions. As noted above, the present invention may be applied to other metals. For example, the vapor could be titaniumtetrafluoride ($TiF_4$) and the ceramic may be a calcium silicate ($CaSiO_3$) ceramic doped with fluorine.

At step 408, the method 400 removes the vapor. In one embodiment, the gas may be removed and then recycled back into the process for producing the high purity metal. For example, the recycling is illustrated in FIG. 2 where $SiF_4$ is purified and recycled to react with Na to produce high purity Si. The method 400 ends at step 410.

Figure 5:
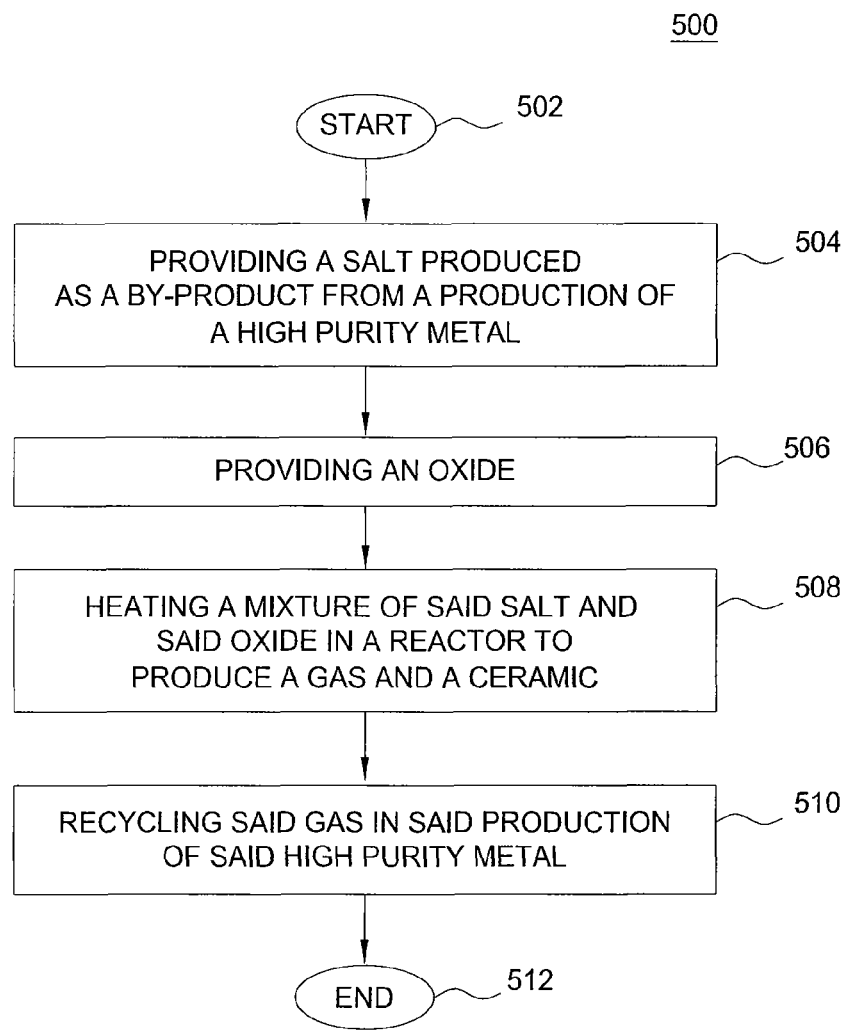
FIG. 5 illustrates a flow diagram of one embodiment of a method for recycling a salt during a production of a high purity metal.

FIG. 5 illustrates a flow diagram of one embodiment of a method 500 for recycling a salt during a production of a high purity metal to produce a ceramic. In one embodiment the production of a high purity metal may be similar to the process illustrated in FIG. 3. The method 500 begins at step 502.

At step 504, the method 500 provides a salt produced as a by-product from a production of the high purity metal. As noted above, in one example, during the production of high purity Si, a by-product of NaF may be produced.

At step 506, the method 500 provides an oxide. The oxide may be a metallic oxide or a non-metallic oxide. As described above with reference to FIG. 2, in one embodiment, the oxide may be a metal oxide that is readily available, such as for example, purified or unpurified silica sand or $SiO_2$.

At step 508, the method 500 heats a mixture of the salt and the oxide in a reactor to produce a gas and a ceramic. The mixture may be heated at temperatures near or even above the melting point of the metal. In one embodiment, the gas may be a $SiF_4$ gas and the ceramic may be a sodium silicate ceramic doped with fluorine ions. As noted above, the present invention may be applied to other metals. For example, the vapor could be $TiF_4$ and the ceramic may be a $CaSiO_3$ ceramic doped with fluorine.

The method 500 includes an optional step 510 that recycles the vapor and gas in the production of the high purity metal. For example, the recycling is illustrated in FIG. 2 where $SiF_4$ is purified and recycled to react with Na to produce high purity Si. The method 500 ends at step 512.

Figure 6:
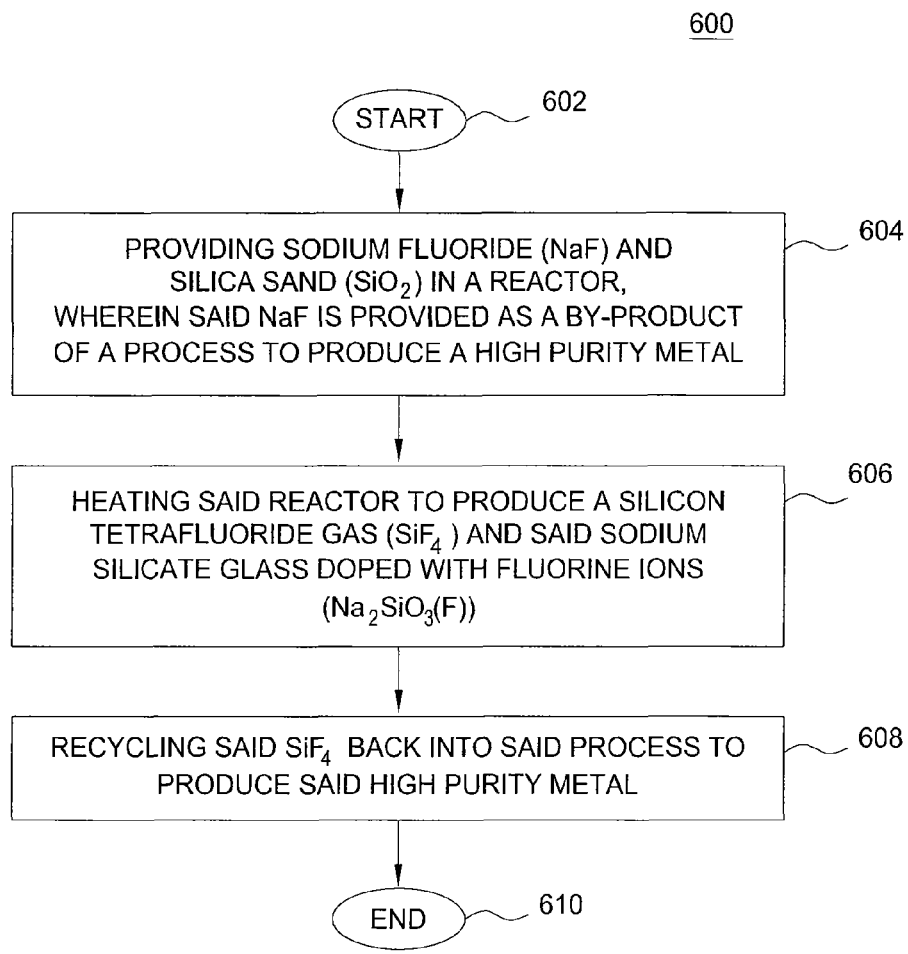
FIG. 6 illustrates a flow diagram of one embodiment of a method for producing sodium silicate glass.

FIG. 6 illustrates a flow diagram of one embodiment of a method 600 for producing sodium silicate glass. In one embodiment, the method 600 may be implemented as described above with reference to FIG. 1. The method 600 begins at step 602.

At step 604, the method 600 provides sodium fluoride (NaF) and unpurified silicon sand ($SiO_2$) in a reactor, wherein the NaF is provided as a by-product of a process to produce a high purity metal. For example, the NaF may be a by-product from a process producing a high purity metal, such as Si, as illustrated in FIG. 3. The reactor may be any type of reactor as described above with reference to FIG. 2.

At step 606, the method 600 heats the reactor to produce a $SiF_4$ gas and the sodium silicate glass doped with fluoride ions ($Na_2SiO_3(F)$). For example, the reactor may be heated within the temperature ranges discussed above in FIG. 2 with respect to reactor 102.

The method 600 includes an optional step 608 that recycles the $SiF_4$ into the process to produce the high purity metal. For example, the recycling is illustrated in FIG. 2 where $SiF_4$ is purified and recycled to react with Na to produce high purity Si. The method 600 ends at step 610.

EXAMPLES

Example 1

A mixture of $SiO_2$ and NaF powders was loaded in a graphite crucible, which was placed inside a gas tight, water cooled, double wall quartz reactor. The graphite crucible and the powder mix were directly heated by induction by means of a radio frequency (RF) coil powered by a RF power supply. The system was then evacuated to eliminate any residual moisture in the system, then heated to 1127° C. The pressure of the gas evolving was measured by a capacitance pressure gauge. The pressure measure was 60 torr.

Example 2

Figure 8:
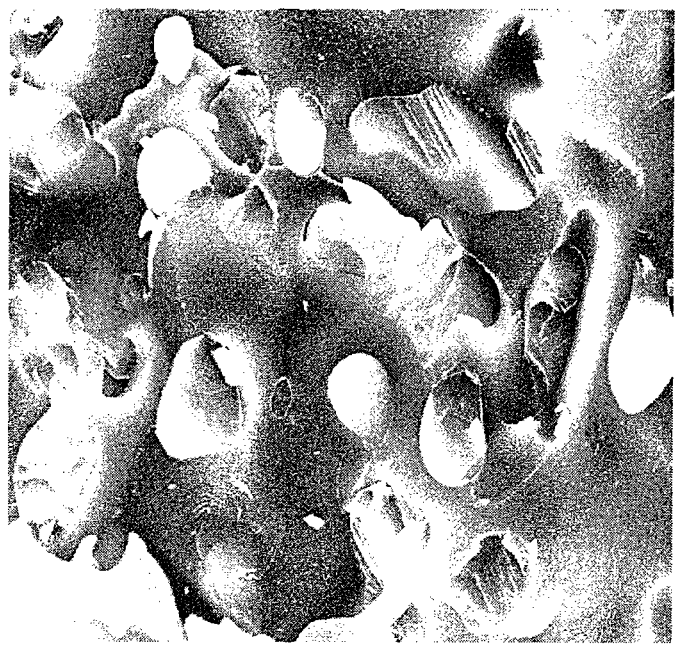
FIG. 8 illustrates a second high magnification image of the fluorine doped silicate ceramic produced from the present invention.
Figure 7:
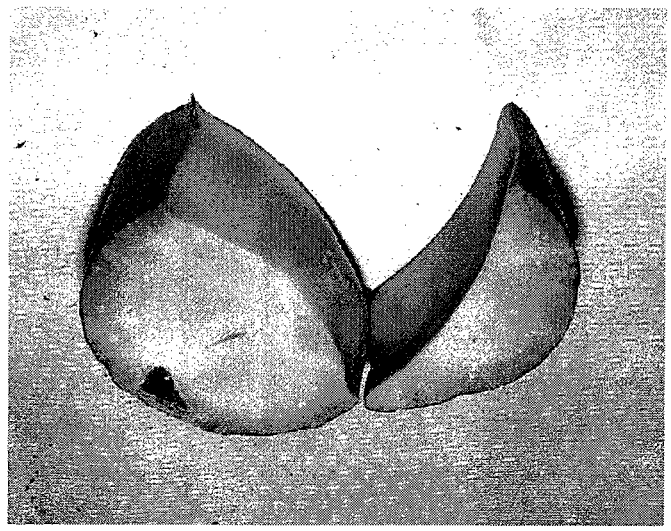
FIG. 7 illustrates an image of a fluorine doped silicate ceramic produced from the present invention.

The experiment was performed as in Example 1, but the temperature was 1227° C. The $SiF_4$ equilibrium pressure obtained was 200 torr. FIG. 7 shows the resulting fluorine doped silicate glass/ceramic and FIG. 8 shows a high magnification of the material.

Example 3

The experiment was performed as in Examples 1 and 2, but the temperature was 1327° C. The pressure obtained was 310 torr.

The thermochemical data for the species involved is well known so that it is possible to estimate the expected pressure by using thermochemical modeling based on the minimization of Gibbs Free Energy programs. The results are summarized in Table 1 below.

TABLE 1

CALCULATED PARTIAL PRESSURES OF SPECIES OVER $4NaF + 3SiO_2$ UNDER NEUTRAL CONDITIONS (atm)

| Species | 1400 K | 1500 K | 1600 K | 1700 K | 1750 K |
|---|---|---|---|---|---|
| Na | 3.39E−07 | 2.02E−06 | 9.52E−06 | 3.71E−05 | 6.88E−05 |
| NaF | 2.30E−03 | 8.16E−03 | 2.44E−02 | 6.31E−02 | 9.70E−02 |
| SiF4 | 3.09E−02 | 1.15E−01 | 3.60E−01 | 9.79E−01 | 1.54E+00 |
| SiOF2 | 3.59E−07 | 3.54E−06 | 2.61E−05 | 1.51E−04 | 3.35E−04 |
| Si2OF6 | 8.44E−05 | 5.48E−04 | 2.81E−03 | 1.18E−02 | 2.26E−02 |
| Na2Si2O5 (1147) | 6.42E−09 | 2.65E−08 | 1.21E−07 | 2.23E−08 | 3.79E−08 |

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for producing sodium silicate glass during a production of a high purity silicon (Si), comprising:

precipitating sodium fluorosilicate ($Na_2SiF_6$) from fluorosilicic acid ($H_2SiF_6$);

thermally decomposing the $Na_2SiF_6$ to produce a silicon tetrafluoride gas ($SiF_4$) and sodium fluoride (NaF);

reducing the $SiF_4$ with sodium (Na) to produce NaF and the high purity Si in a first reactor;

providing the NaF from the reduction of the $SiF_4$ from the first reactor and silica sand ($SiO_2$) in a second reactor; and heating the second reactor to produce additional $SiF_4$ and the sodium silicate glass doped with fluorine ions ($Na_2SiO_3(F)$), wherein the heating comprises providing energy released from the first reactor in an exothermic reaction of the $SiF_4$ that is reduced with the Na;

purifying the additional $SiF_4$ via a condenser absorber train; and recycling the additional $SiF_4$ back into the reducing step.

2. The method of claim 1, further comprising:

recycling the $SiF_4$ back into the process to produce the high purity metal.

3. The method of claim 1, wherein heating comprises heating the second reactor at a temperature of between a range of 1000 degrees Celsius (° C.) to about 1500° C.

* * * * *